Patented June 21, 1938

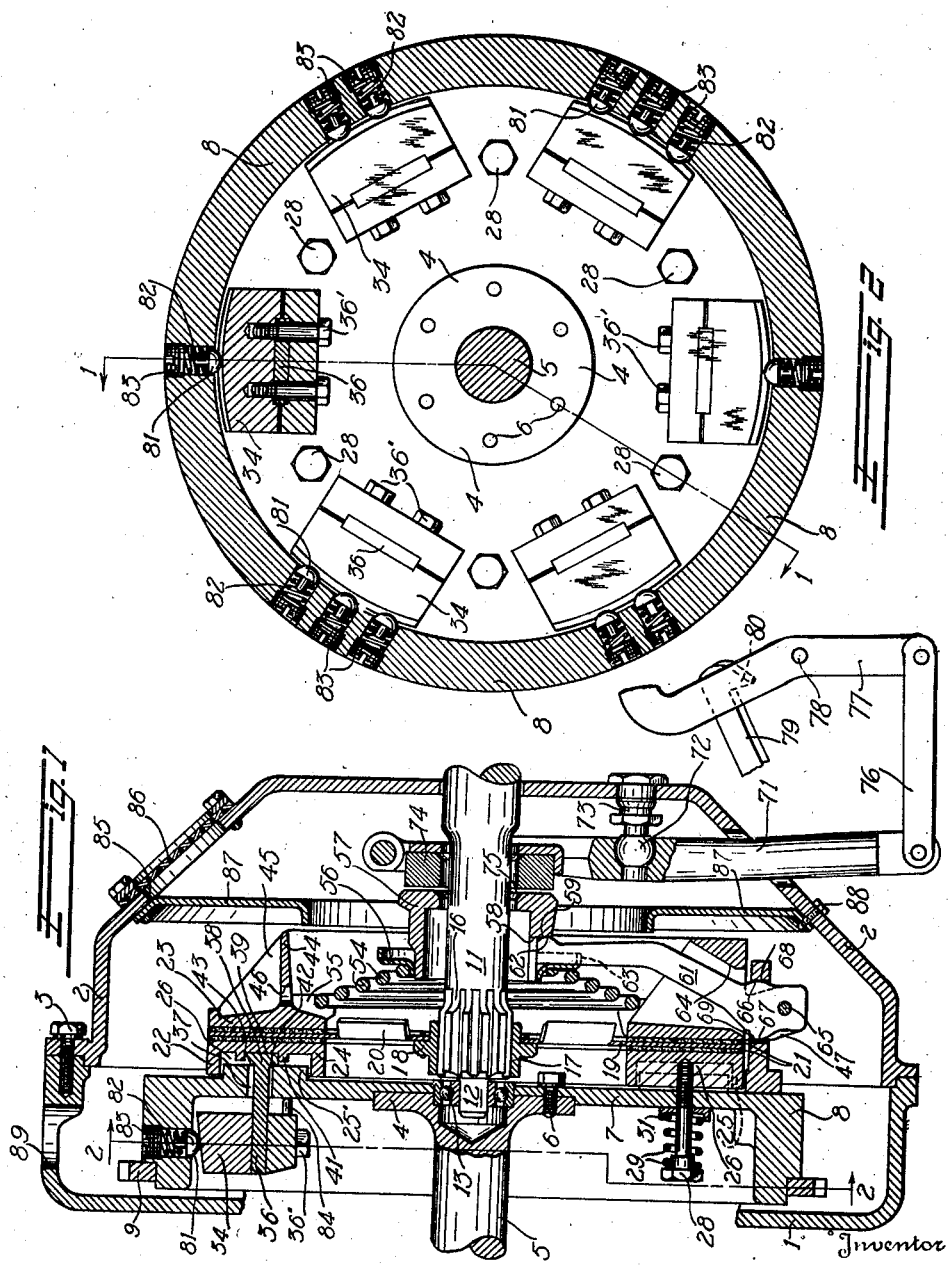
June 21, 1938.   W. E. HAUPT   2,121,663
AUTOMATIC POWER TRANSMITTING MECHANISM
Filed Jan. 27, 1933   5 Sheets-Sheet 1
Inventor
William E. Haupt
Strauch + Hoffman
Attorneys

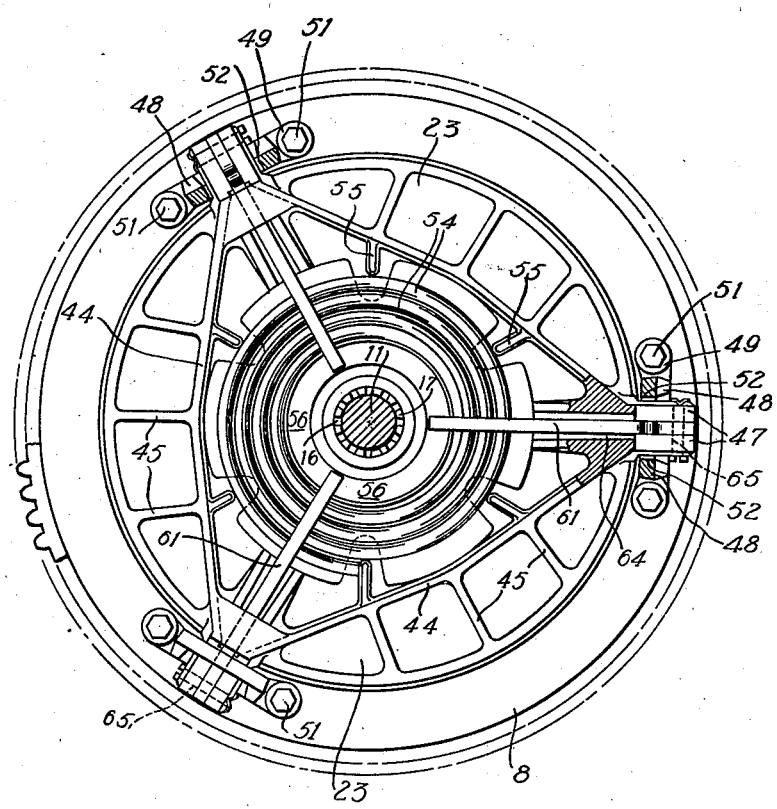
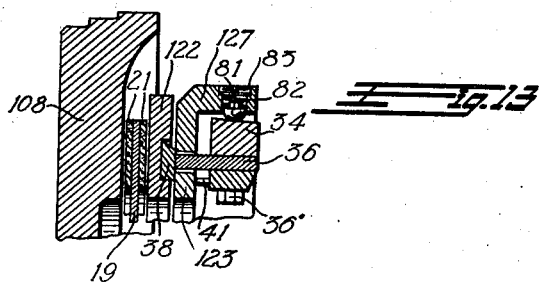

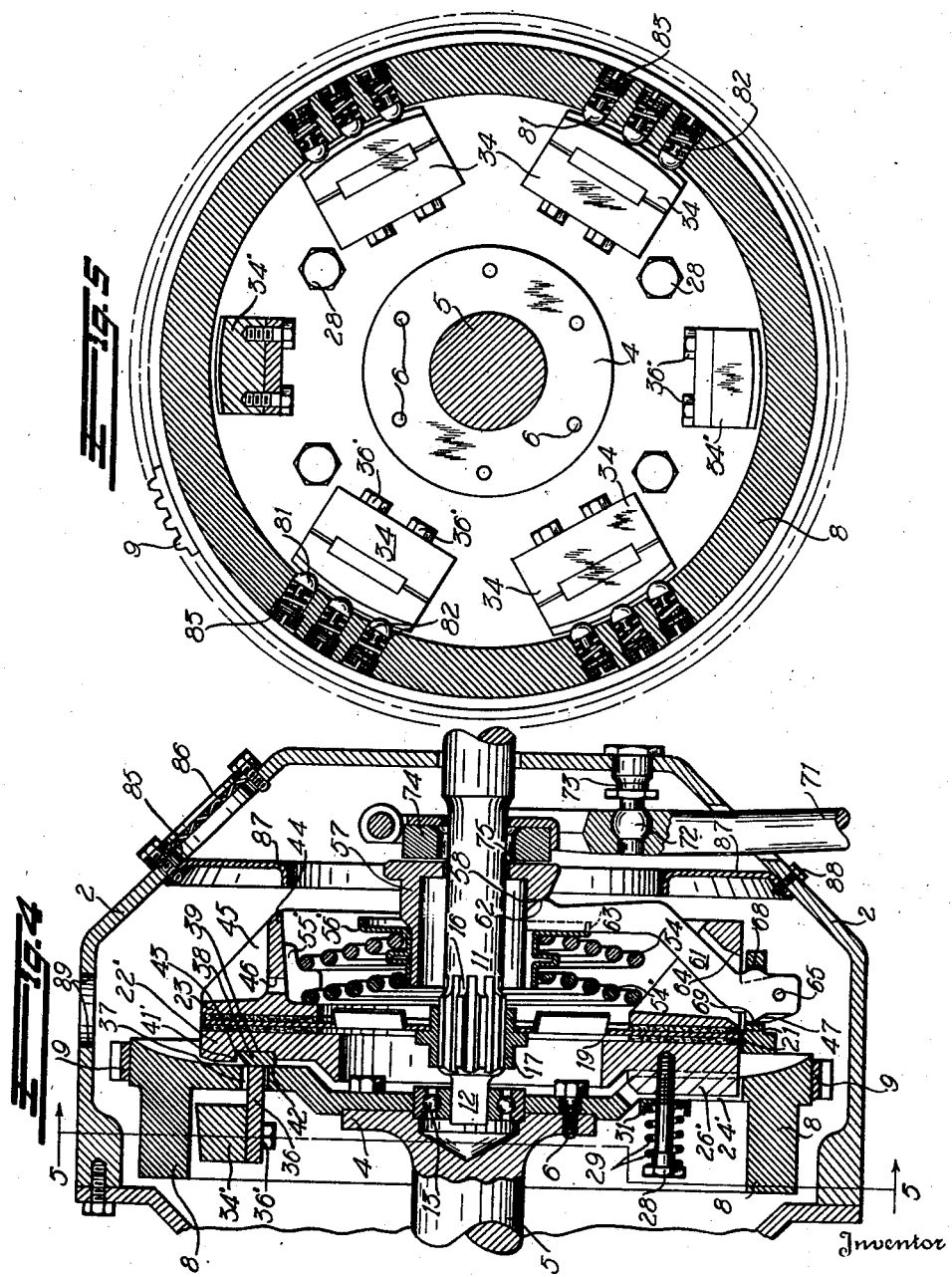

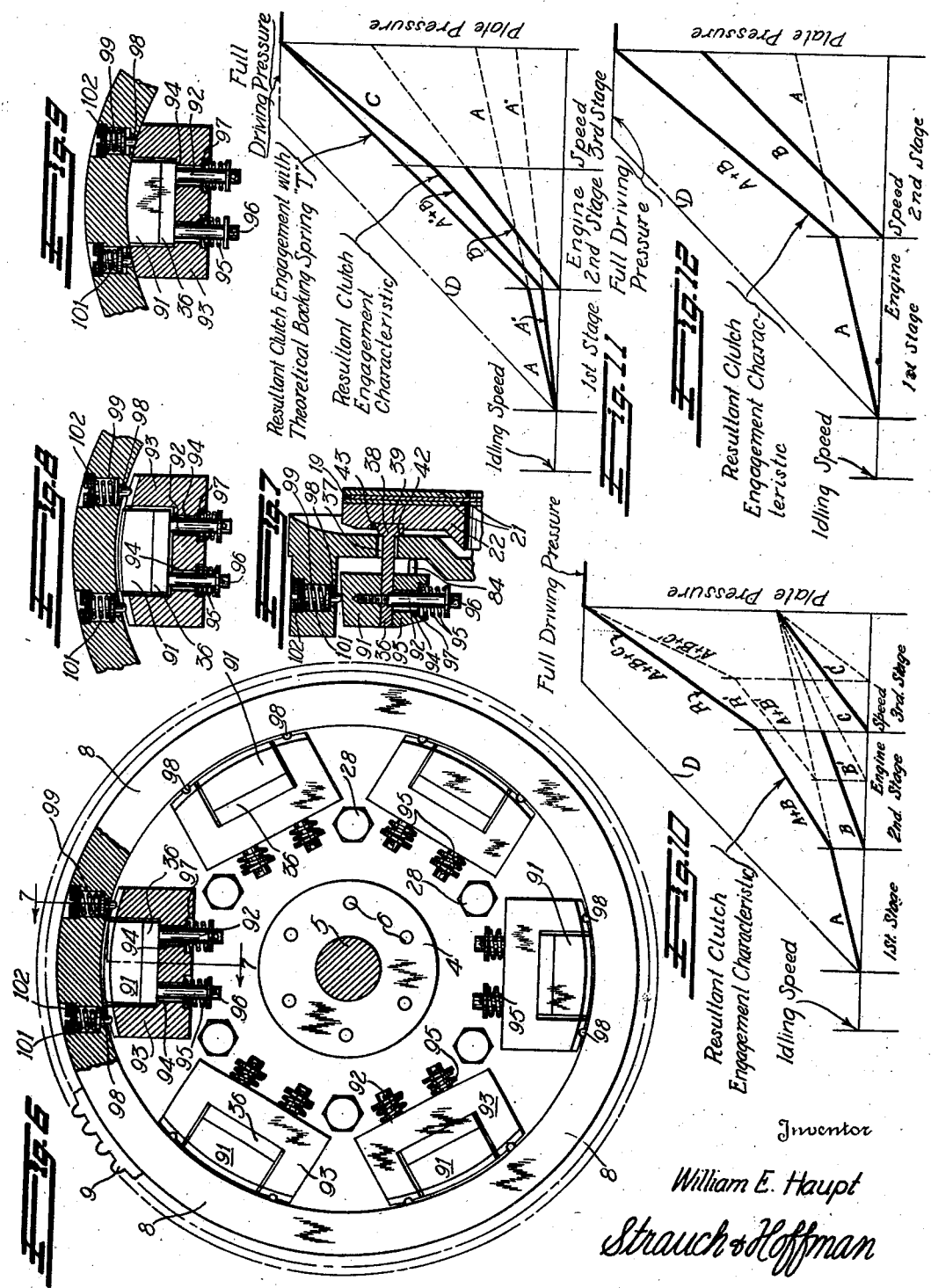

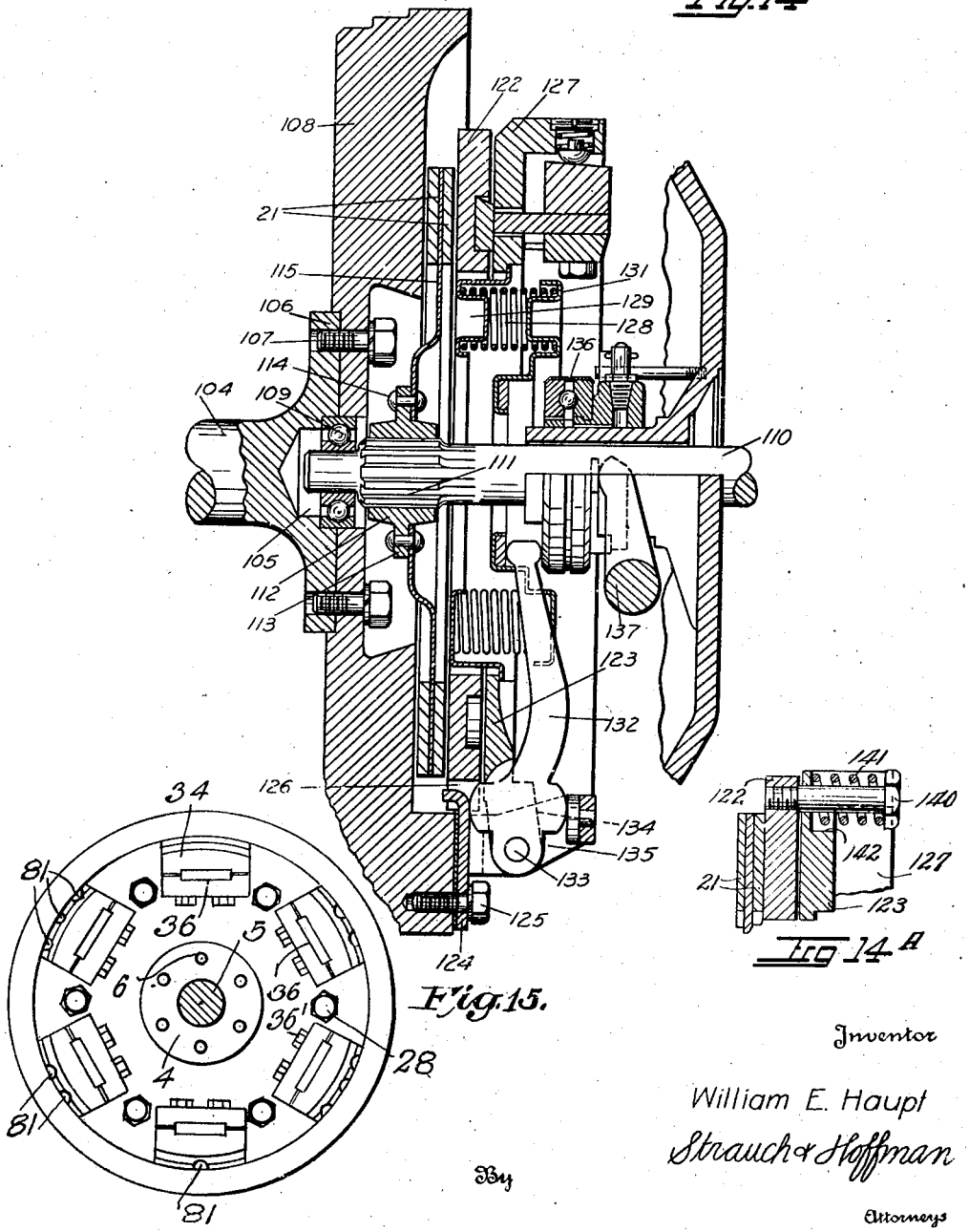

2,121,663

UNITED STATES PATENT OFFICE 2,121,663

AUTOMATIC POWER TRANSMITTING MECHANISM

William E. Haupt, Brooklawn, N. J., assignor to Automatic Drive & Transmission Company, Gloucester City, N. J., a corporation of New Jersey Application January 27, 1933, Serial No. 653,875

30 Claims. (Cl. 192—105)

The present invention relates to automatic mechanisms for establishing a power transmitting connection between a driving member and a driven member. More particularly the present invention relates to automatic or self-operated clutch mechanisms adapted for motor vehicle or similar drives.

In copending application Serial No. 595,184, filed February 25, 1932, an automatic clutch mechanism is disclosed having a driven member disposed between an automatic plate and a positive plate, and the latter are carried and driven by the driving member. The positive plate is resiliently backed up by means of a plurality of springs, and the automatic plate is automatically actuated in accordance with the speed of the driving member to clamp the driven member between the automatic and positive plates, and cause pressure to be built up in the backing springs as the driving member is accelerated. The backing springs are so designed and associated with the mechanism that they act sequentially to cause the driven member to be clamped with a comparatively slowly increasing frictional force during the initial stage of movement of the automatic plate, and with a more rapidly increasing force during the second stage of automatic plate movement. This mechanism accordingly causes the driving member to transmit a torque of small and slowly increasing magnitude to the driven member when the load is being accelerated or "picked up" from stationary or substantially stationary condition, when the degree of slippage or relative motion of the driving and driven members is greatest, resulting in smooth acceleration of the vehicle or other load being handled by the mechanism. The generation and transmission of damaging shocks to clutch mechanism and vehicle parts is thereby avoided. When the vehicle or other load has been accelerated to the point where the degree of slippage between the driving and driven members is no longer excessive, the backing springs then operate to cause the plate pressure to build up at a greater rate as the automatic plate undergoes its second stage of movement. During the last stage of automatic plate movement, the plate pressure builds up and a torque of rapidly increasing magnitude is transmitted to the driven member until a frictional driving force is attained sufficient to cause the automatic and positive plates and the driven member to rotate in unison. The second pressure stage is then at end and clutch engagement is completed.

Clutch engagement therefore occurs in a plurality of pressure stages, and multi-stage clutch operation is obtained with a mechanism that is of basically single stage design.

In copending application, Serial No. 621,714, filed July 9, 1932, an automatic power transmitting mechanism of the above mentioned character is disclosed, wherein movement of the automatic plate is modified to produce pressure staging of clutch engagement.

The practical design, long operating life and highly desirable smooth operating characteristics of these clutch mechanisms render them applicable to a wide variety of drives and are especially adapted for use in automotive or similar drives where such units are subjected to severe abuse in the hands of unskilled or careless operators. The present invention provides mechanisms having the desirable operating characteristics of the mechanisms disclosed in the above mentioned applications, and further highly desirable characteristics to be hereinafter pointed out, but are constructed and accomplish the desired pressure staging operations in a somewhat different manner.

It is a primary object of the present invention to provide automatic power transmitting mechanisms of the character mentioned having means for actuating the automatic plate in such manner, that as the driving member is accelerated, the driven member is frictionally gripped with a force of slowly increasing magnitude, and upon further acceleration of the driving member, the driven member is frictionally gripped with a force of more rapidly increasing magnitude, whereby pressure staging is effected and the driven member is automatically accelerated smoothly and without shock.

Another object of my invention is to provide automatic power transmitting mechanisms of the character mentioned wherein speed responsive mechanism is associated with the automatic plate for causing clutching movement thereof to take place throughout a substantial range of speed of the driving member, and means are associated with the automatic plate actuating mechanism for modifying its action so that the initial stage of automatic plate movement is caused to occur over a substantial speed range of the driving member, for thereby causing the major part of automatic plate movement to occur during the upper range of speed of the driving member, thereby effecting pressure staging of clutch engagement and insuring smooth pick-up of the load regardless of in what manner the driving member is accelerated.

A further object of the present invention is to provide automatic power transmitting mechanism of the character mentioned with means for modifying the action of the automatic plate actuating mechanisms and with means for modifying the action of the resisting means of the positive plate whereby automatic plate movement may be controlled so as to occur over any desired speed range, and the action of the positive plate resisting means may be controlled and coordinated with the automatic plate movement and any desired clutch engagement characteristic obtained.

It is a further object of my invention to so design mechanisms of the character mentioned that they are not sensitive in operation even though the plate clearance should be excessive when the mechanism is in automatic idle release condition.

Another object of my invention is to provide automatic power transmitting mechanisms of the character mentioned with mechanism for actuating the driving member in such manner, that, upon initiation of automatic engaging operation, only portions of the cooperating working surfaces or frictional areas of the driving and driven members are brought into driving engagement, whereby a torque of relatively small magnitude is transmitted to the driven member, and the latter is smoothly accelerated without chattering or shock.

Another object of the present invention resides in the provision of automatic power transmitting mechanisms with mechanism for automatically actuating the driving member in such manner that during the initial portion of the engaging operation, only a portion of the cooperating areas of the frictional surfaces of the driving and driven members are brought into frictional driving engagement, and as the engaging operation proceeds, the area of engagement of the driving and driven members is progressively increased until the driving and driven members are disposed in full engagement.

Another object of the present invention is to provide novel throwout mechanisms for power transmitting mechanisms of the character mentioned, whereby declutching may be promptly and readily effected during any phase of operation of the speed-responsive mechanism.

Additional objects of the present invention will become apparent as the following detailed description thereof proceeds and from the appended claims, when taken in conjunction with the accompanying drawings.

In the drawings:

Figure 1 is a longitudinal sectional view of an automatic power transmitting mechanism forming part of the present invention.

Figure 2 is a view taken substantially on the line 2—2 of Figure 1, as viewed when looking in the direction of the arrows.

Figure 3 is a view of the mechanism shown in Figure 1 as it appears when viewed from the right of that figure with the housing throwout lever, and thrust member removed.

Figure 4 is a longitudinal sectional view of a modified form of automatic power transmitting mechanism forming part of the present invention.

Figure 5 is a view taken substantially on the line 5—5 of Figure 4, looking in the direction of the arrows.

Figure 6 is an end view of the flywheel and associated mechanism disclosed in Figure 4 with a modified form of weight organization associated therewith.

Figure 7 is a sectional view taken approximately on the line 7—7 of Figure 6, looking in the direction of the arrows.

Figure 8 is a fragmentary sectional view of one of the weight assemblies shown in Figure 6, with the primary weight in an intermediate position, and with the secondary weight in its retracted position.

Figure 9 is a view similar to Figure 8 with both primary and secondary weights disposed against the flywheel rim.

Figures 10, 11 and 12 are graphs illustrating the relative pressures existing between the clutch plates of the various modifications of the invention disclosed at different engine speeds, and Figure 13 is a fragmental view in section illustrating retarding units associated with the centrifugal weights of a slightly different type of automatic clutch mechanism.

Figure 14 is a longitudinal sectional view of a modified form of the power transmitting mechanism forming the present invention.

Figure 14A is a fragmental sectional view of the clutch shown in Figures 13 and 14 and illustrates one of the holdback spring assemblies.

Figure 15 is a view similar to Figure 2, but illustrating a modified arrangement of the weight retarding assemblies.

With continued reference to the drawings, wherein like reference characters designate like parts throughout the several views thereof, and referring more particularly to Figures 1, 2 and 3 thereof, a bell housing 1, having a cover or complemental housing member 2 secured thereto by bolts 3 or the like, houses the clutch mechanism, and they will both be referred to hereinafter as the clutch housing.

Secured to flange 4 of the engine or driving shaft 5, by means of bolts 6 or the like is web portion 7 of flywheel 8. Flywheel 8 is provided with the usual starting gear 9 on the periphery thereof. Disposed in axial alignment with shaft 5 and mounted for rotation, is driven shaft 11 which is reduced at 12 at one end and journaled in an anti-friction pilot bearing assembly 13, secured in the flywheel web in well known manner. Shaft 11 is adapted to have the other end operably connected to a suitable gear changing apparatus for amplifying the torque applied to the final driven member, and is journaled in a suitable anti-friction bearing assembly (not shown). Driven shaft 11 has a splined portion 16, on which a correspondingly splined hub 17 is mounted. Hub 17 is provided with a flange 18 to which is suitably secured, as by welding, riveting or the like, a relatively thin metal disk 19, which constitutes the driven clutch member. Disk 19 has fan blades 20 struck out of the body thereof adjacent its junction with flange 18 for the purpose of inducing and allowing ventilating air to pass therethrough in a manner presently to be described. Each face of disk 19, near the periphery thereof, is provided with a facing 21 which may consist of any material that has the required characteristics to give it the correct frictional gripping force, and at the same time has wearing qualities adapting it for this purpose.

I prefer, however, to employ the lubricated type of material disclosed in the patent to Charles B. Heinrich, Number 1,979,880, issued November 6, 1934, which embodies large percentages of graphite, and which in practice have given very satisfactory results in a clutch of this character.

Frictional facings 21 may be secured to the disk 19 in any suitable manner, as for instance by rivets or the like. Each facing 21 cooperates with a suitable annular driving plate for effecting a driving connection between the driving shaft 5 and the driven shaft 11. Plate 22, which is adapted to engage one of the facings, I term the automatic plate for the reason that it is automatically actuated, and plate 23, which is adapted to cooperate with the other facing, is termed the positive plate.

The construction of automatic plate 22 and its actuating mechanism will now be described. Plate 22 has a strengthening rib 24 formed on the inner periphery thereof, and a similar strengthening rib 25 is provided on its outer periphery. Ribs 24 and 25 fit over and cooperate with an annular boss 25', preferably formed on the web portion of the flywheel. Annular boss 25' is provided with radial slots which form driving faces and which are adapted to receive radial keys 26, that are formed on plate 22, and are contiguous at their ends, with inner and outer ribs 24 and 25, respectively. The number of keys employed in a particular installation is determined by a consideration of the forces they must transmit, for instance, in the clutch here illustrated, which is designed for relatively heavy work, six equally spaced keys are employed. Each key 26 is bored and tapped to receive a threaded holdback bolt 28 which extends through an aperture in the flywheel web. Disposed about each bolt 28 and having one end thereof bearing against the bolt head is a compression spring 29. The other end of each spring 29 bears against a cup or like positioning member 31 which abuts the rear face of the flywheel web. While it is not absolutely essential, it is preferable to provide plate 22 with as many holdback springs as there are driving keys in order that a uniform holdback pressure may be exerted thereupon.

The holdback springs, accordingly, uniformly exert pressure on plate 22 and urge it toward the flywheel web, and radial keys 26 cooperate with the slots formed in boss 25' to cause plate 22 to rotate with the flywheel, and yet permit its free axial movement.

Plate 22 is caused to move away from the flywheel web against the action of holdback springs 29 for frictional engagement with facing 21 of member 19 by speed responsive means, which in the present instance take the form of centrifugal mechanism, that is responsive to speed variations of the flywheel by which it is preferably carried. Centrifugal weights 34 each preferably consists of two sections, one section of which has an inclined face formed thereon adapted to contact with the flywheel rim when the weight is in its extreme outward position, and an inner section which carries a stop for engaging the flywheel web. The weight sections are disposed on either side of an elongated rectangular lever member 36, and are securely clamped thereto by means of cap screws 36', that extend through apertures in one of the weight sections and lever member, and are tapped into the opposite weight section. Levers 36 are of substantial width and extend through chordal slots 37 formed in flywheel web 7 and boss 25', and are disposed between the keyslots formed in boss 25' and terminate short thereof. Lever sections 36 carry at their extremities heads 38, each of which is provided with a flat face 39 that normally abuts the bottom face of an elongated rectangular bearing recess defined by spaced chordal ribs 41 formed in automatic plate 22. Ribs 41 serve to give plate 22 rigidity and at the same time constitute heat radiating fins for dissipating heat generated in plate 22, as will be presently described. Heads 38 are also provided with reaction faces 42 adapted to abut the face of the flywheel web, and are designed for sliding and fulcruming engagement therewith during operation of the weights. Heads 38 also have their outer sides relieved to provide knife-like edges 43 which are adapted to fulcrum and seat in the angles defined by the face of automatic plate 22 and the outer ribs 41.

As the speed of the flywheel increases, weights 34 gradually swing outward about their knife edges 43 as they pivot in response to centrifugal force. As this occurs, reaction faces 42 of heads 38 abut and slide on the flywheel web and the edges 43 thereof engage automatic plate 22, forcing the plate away from the flywheel web and into clutching engagement with facing 21 carried by disc 19. There is very little sliding engagement of parts in this arrangement since the contact of edges 43 with plate 22 is of a knife edge pivotal character, and they always fulcrum on the same part of the surface of plate 22 because they are definitely positioned by ribs 41. The sole sliding movement present is at the edges of reaction faces 42. The movement is small, however, and plate 22 is accordingly given a smooth and easy movement, and harsh or grabbing clutch action is avoided.

The seats formed by the face of plate 22 and the outer ribs 41 constitute bearing recesses in which edges 43 of weight heads 38 fulcrum, and while I prefer to employ this arrangement, it is to be understood that the bearing recesses could be formed in weight heads 38 and the knife edges formed on plate 22, or a member or members secured thereto, if desired without departing from the spirit of the present invention.

Positive plate 23 is preferably provided with three substantially chordal flanges 44, which are preferably formed integral with plate 23 and are braced on either side by angular web members 45 which are integrally formed with flanges 44 and plate 23. Flanges 44 are provided with apertures 46 which are disposed at intervals between web members 45 for a purpose that will presently appear. At the junction of each pair of flanges 44, a pair of spaced lugs 47 are formed on the positive plate, which serve to key the positive plate to the flywheel and to also cooperate with levers to cause positive plate 23 to undergo declutching movements. Each pair of lugs 47 is slidably received in a saddle fulcrum member 48 provided with apertured lugs 49. Lugs 49 are secured to the face of the flywheel by means of cap screws 51 or the like. The apertures in fulcrum members 48 are sufficiently large to permit axial movement of the positive plate for declutching purposes, and the positive plate is caused to be driven by the flywheel by contact of driving faces 52 of fulcrum members 48, with the opposite sides of lugs 47.

Positive plate 23 is urged toward the driven member, and the automatic plate by means of a compression spring 54, one end of which rests in a seat defined by spaced lugs 55 preferably formed on positive plate 23. The other end of spring 54 seats against a cup member 56 which is rigidly secured to a thrust member 57. Located at 120° intervals about the periphery of thrust member 57 are slots 58, the bottoms of which form fulcruming faces 59. Declutching levers 61 have their inner ends disposed and clamped between cup member 56 and thrust member 57. Each lever 61 is provided with a fulcruming surface 62, which is adapted to cooperate with face 59 formed on thrust member 57. Cup member 56 is slotted at 63 to receive the inner ends of levers 61 and maintain them in spaced assembled relation. The outer ends of levers 61 pass through apertures 64 formed in the positive plate, and are pivotally connected to lugs 47 by pins 65, which pass through one lug 47 and lever 61 and are threaded into the other lug. Levers 61 are provided with fulcrum faces 66 and 67 which cooperate with faces 68 and 69 formed on fulcrum members 48 respectively.

Referring to Figure 1, the positive plate is shown with the driven member clamped between it and automatic plate 22, and the automatic weights are disposed in their innermost, or neutral positions. This condition is due to the fact that lever 71 is released and allows movement of member 57 under the influence of spring 54, which acts as follows. The left end of spring 54 directly urges plate 23 to the left. The other end of spring 54 acts against disc 56 to so rock levers 61 to cause their fulcruming faces 66 to engage faces 68 formed on member 48. Levers 61, upon fulcruming about their faces 66 cause their outer ends to move toward the flywheel. This action urges lugs 47, and positive plate 23 carried thereby, to the left to bring the positive plate into engagement with the driven member. With the parts in this position, spring 54 urges cup member 56 against the three point suspension on lever 61 and holds it in axial alignment with driven shaft 11. Positive plate 23 accordingly is directly urged into contact with the driven member by one end of spring 54, and the other end of spring 54 reacts against levers 61 to impose an amplified, or multiplied force upon plate 23 to urge it against the driven member. When thrust member 57 is moved to the left, throwout levers 61 rotate to cause their fulcrums 67 to cooperate with fulcrum faces 69 formed on members 48, to withdraw the positive plate 23 into declutched position.

Thrust member 57 is caused to move to the left for declutching purposes by means of a throwout lever 71 which is pivoted, by means of a ball and socket connection 72, to a suitable support 73 secured to the clutch housing. The inner end of lever 71 carries an annular bearing 74 thereon which is adapted to cooperate with a smooth polished face 75 of thrust member 57. Bearing 74 may consist of any desirable material, but is preferably constructed of graphite or some other material of a self-lubricating character. The outer end of lever 71 is connected by a link 76 to one end of a clutch pedal 77 which is pivoted on the vehicle frame as indicated at 78. A latch member 79 provided with a latching face 80 is pivoted to the vehicle frame in any suitable manner (not shown) and is designed upon selective manual operation to retain clutch pedal 77, and hence lever 71, in automatic position. As shown in Figure 1, latch 79 is disposed in inoperative position and clutch pedal 77 and lever 71 are disposed in manually engaged position.

Referring more particularly to Figure 2 of the drawings, weights 34 are of preferably equal mass, and are contacted by plungers 81 which are slidably mounted in bores in the flywheel rim and are urged inwardly by compression springs 82. Springs 82 react against plugs 83, threaded into the bores in the flywheel rim. These spring and plunger assemblies will hereinafter be referred to as retarding units, because they act so as to retard the movement of weights 34 in response to centrifugal force. Weights 34 are prevented from being urged inwardly beyond their normal neutral position in response to the action of plungers 81, by means of stops 84 formed thereon. These stops also prevent the weights from swinging past neutral position when the engine is suddenly decelerated.

Modification of the action of the automatic plate actuating means and resulting pressure staging of clutch engagement is effected by providing various groups of weights with various sets of retarding units. For instance, referring to Figure 2, the top and bottom weights are each shown as being provided with a single retarding unit, thus offering but small resistance to the movement of these weights. Another diametrically opposed pair of weights is provided with two retarding units for each weight, and the remaining pair of diametrically opposite weights are each provided with three retarding units. These weights will hereinafter be termed the first, second and third state weights respectively. As the engine or other prime mover is accelerated, the first stage weights will be the first to operate since the resistance to movement thereof is small. Upon further acceleration of the engine, the second stage weights will then exert their driving force upon plate 22, and finally, when practically non-slipping drive conditions exist, the third stage weights will operate and exert their driving force upon plate 22 and bring the plates together into final or non-slipping engagement. The plates under final engagement conditions, are accordingly held in engaged condition under the combined influence of the first, second and third stage weights.

The clutch parts in Figure 1 are shown in positive position, with the automatic weights in their inner or neutral positions which they take when the engine is stationary or operating at idling speeds and with positive plate 23 urged into frictional engagement with the driven member by spring 54. This position of the clutch throwout mechanism corresponds to a fully retracted clutch pedal position.

In practice, the clutch pedal is normally locked or latched in its intermediate automatic position, holding plate 23 in such a position as to establish clearance between the positive and automatic plates and the driven member when the engine is stationary or operating at idling speeds.

When the clutch shown in Figure 1 has the pedal thereof latched in automatic position and the engine is idling, a clearance exists between the automatic and positive driving plates and the driven member, and the automatic weights are disposed in their innermost or neutral positions. As the flywheel is accelerated, the first stage weights pivot outwardly and cause faces 42 of heads 38 to engage the flywheel web and knife edges 43 to fulcrum in automatic plate 22, and causing automatic plate 22 to lift or move away from the flywheel web against the action of springs 29. Due to the reaction of springs 29 and 82, movement of the weights will be smooth, and there will be no tendency for them to vibrate or undergo other undesirable movements. The first stage weights operate first because there is less resistance to their movement, than that opposing movement of the second and third stage weights. The retarding units for the first stage weights are designed to allow the first stage weights to force the automatic plate into light frictional driving engagement with the driven member for transmitting a torque of small and slowly increasing magnitude thereto over a substantial speed range prior to operation of the second stage weights. Accordingly, automatic plate 22, under the influence of the primary weights, is given a smooth engaging movement and causes a torque of small, and slowly increasing magnitude to be transmitted to the driven shaft. The first stage operation, normally takes place at comparatively low engine speeds and is complete or merges into the second stage of clutch engagement, when the speed of the driving member has become sufficiently great for the centrifugal force of the secondary weights to overcome the effect of their retarding units and exert substantial driving pressure upon the automatic plate. During the latter part of the first stage of engaging operation, the secondary stage weights swing outwardly against the action of spring 82, with their heads in operative contact with plate 22, but they normally only exert a slight driving force upon plate 22 under these conditions.

During the second stage of clutch engagement, the automatic plate, under the combined actuating force of the first stage weights and the second stage weights, is moved with greater, and more rapidly increasing engaging force into contact with the driven member and consequently the driving plates transmit a torque of greater, and more rapidly increasing magnitude to the driven shaft.

When the speed has become sufficiently great, the third stage weights move outwardly against the action of their retarding units and exert their driving force upon automatic plate 22. The automatic plate is now urged into final clutched condition under the combined influences of the first, second and third stage weights, and hence a comparatively rapid build up of plate pressure occurs during this stage. When weights 34 have moved into contact with the flywheel rim, the plate pressure is sufficient to prevent slippage between them under any condition, thereby affording a positive driving coupling. It is contemplated that normally the third stage of engaging operation occurs just prior to the final driving conditions when no slippage is desired between the driving and driven members.

It is to be understood that the retarding effects of the various retarding units may be predetermined by selecting springs of proper strength, or by adjusting plugs 83 to vary their compression, and accordingly the first, second and third stages may be caused to overlap each other to any degree desired. In fact, the stages may be so overlapped, that the merger of one into the other is so complete, that initiation or completion of the various stages cannot be detected by any torque-speed measurement experiments, thus providing a power transmitting mechanism whose pick-up is smooth throughout the entire clutching operation. If desired, the weights may also be selected to have the proper mass to effect the desired correlation of the pressure stages. The retarding units may be so designed, and it is preferable to so design them, that the first and second stages of clutch engagement occupy the greatest part of the engaging operation speed range, since most of the slippage should occur during the initial engagement of the clutch members, when the difference in the speeds of the driving and driven shafts is relatively great. The third stage of clutch engagement occurs over only a small portion of the engaging operation speed range, and the build up of pressure in this stage is relatively rapid. Such rapid build up of pressure in the third stage is proper and is desired because at this time the relative speed of the driving and driven members is comparatively low, and comparatively rapid engagement will do no harm in comparatively rapidly synchronizing the driving and driven shafts.

The provision of building up clutch plate pressures in separate distinct stages, renders the mechanism highly practical and in combination with the novel facing material employed in my clutch gives a smooth pick-up in slipping drive and a long useful life to the mechanism.

Referring to Figure 10 of the drawings, I have illustrated a diagrammatic representation of the pressure existing between the plates of the mechanism just described, during the different pressure stages, at various engine speeds. Referring to this figure, lines A, B and C represent the individual pressure exerting effects of each pair of first, second and third stage weights respectively. The projections of lines A and B beyond their stages, meet at a common point along with line C, because the weights are of equal mass, and any pair of them must exert the same final driving pressure as any other pair. In other words, the respective lines A, B and C represent the final individual pressure that would be exerted by each pair of first, second and third stage weights if they were each allowed to independently move into contact with the flywheel rim. The resultant curve R, represents the actual plate pressures, and is obtained by adding the ordinates of each individual curve. Curve R graphically illustrates that no plate pressure exists until the engine is accelerated to a speed substantially above idling speed, and the plates are brought into engagement, a low pressure build-up occurs in the first stage of clutch engagement, an increased build up of pressure occurs in the second stage, and a greatly increased build-up of pressure occurs in the third stage of clutch engagement. When full engaging pressure is reached, the curve assumes a horizontal configuration, showing no further pressure build-up, and the plates are in non-slipping engagement under these conditions. This final pressure is maintained under these conditions at a substantially constant value by virtue of the weights contacting the flywheel rim, and causing the automatic plate to grip the driven member between it and the positive plate against the reaction of the pressure springs of the latter. The weights are therefore restrained from exerting further increased forces upon the automatic plate as the engine is further accelerated. Of course, it will be understood that in practice the curves would probably not be rectilinear, but would probably be of curved configuration. The curves have been here disclosed as straight lines for the purpose of more simply and clearly bringing out the pressure staging functions of the clutch mechanism.

As has already been stated, the clutch engagement operation in any one stage, and the length of the various pressure stages may be readily modified by varying the resilience of the retarding units, and in the same graph that has just been described such modified clutch engagement characteristic is shown. Referring to this graph, dotted lines B' and C' illustrate the pressure-speed characteristic of each pair of second and third stage weights when provided with stronger retarding units, and the line R' represents the resultant characteristic of the lines A, (which was not changed during the modification of the strength of the retarding units for the second and third stage weights) B' and C'. It is observed that this characteristic shows a clutch engagement operation wherein one-half of the entire engine speed range, during the clutching operation, is devoted to the first stage of cutch operation, and during this operation, the plate pressure is relatively low and increases slowly with an increase in speed. The second half of this speed range is devoted to the second and third stages of clutch operation, and during these stages the pressure builds up relatively rapidly. By selecting the proper springs for the retarding units, the clutch engaging characteristic may accordingly be given any configuration desired, and perfect clutch engagement obtained.

The line D represents the approximate characteristic that the mechanism would have if the retarding units were omitted and the weights unrestrained from freely moving outwardly in response to centrifugal force, and illustrates a rapid pressure build-up throughout the entire speed range of the prime mover. Line D also shows that final engagement pressure is attained at a speed that is materially below that for line R, and the speed range during which engagement occurs is accordingly decreased.

The preferred operation of the above described clutch mechanism when installed in a motor vehicle having a conventional three speed transmission, is as follows: The positive plate is maintained in automatic position with the latching means above referred to, and if the vehicle is on level ground, the transmission is placed in high gear and the engine accelerated. As the engine gains speed, weights 34 gradually swing outwardly and produce clutch engagement in stages as previously described, causing the driving shaft to transmit a gradually increasing torque to the rear wheels, and the vehicle is started smoothly and without shock. When the vehicle, and consequently the engine, attains sufficient speed, the weights swing out into contact with the flywheel rim. When this condition is reached the plates are disposed in non-slipping engagement, and a direct drive from the driving to the driven shaft is thereby automatically effected. When operating the vehicle in this manner, and it is desired to bring the vehicle to a stop, the accelerator is released and the brakes are applied. When the vehicle has been decelerated to a speed corresponding substantially to idling speed, through the combined braking action of the engine and brake mechanism, the centrifugal mechanism releases the clutch, and the vehicle may be brought to a complete stop by continued application of the brakes, or if traffic conditions permit, the accelerator may be depressed and the engine accelerated to cause almost immediate reengagement of the clutch and the vehicle is again picked up in high gear.

When operating in high gear, or any other gear, for that matter, and a grade is encountered that requires more torque than the engine can deliver in that particular gear under the existing speed conditions, the engine will naturally decelerate under such excess load, and weights 34 will swing inwardly to a slight extent, and permit slippage between the clutch plates. Since it is an inherent characteristic of an internal combustion engine to deliver more torque as its speed is increased up to its peak of torque output, the speed of the engine, through the slipping drive between the engine and the rear wheels, existing at this time, will be accelerated sufficiently to develop sufficient torque to carry the vehicle over the grade with a slipping, torque-transmitting drive between the engine and the rear wheels, thus doing away with the necessity of shifting into a lower gear in many instances.

As the vehicle gains speed up the grade, or the vehicle again reaches substantially level road, weights 34 will again exert sufficient pressure on the clutch plates to establish a non-slipping drive between them. This mode of operation is made possible by the lubricated character of the facing material that is employed in the present clutch mechanism, in combination with the effective ventilating and dust removing provisions that are incorporated therein.

When the automatic plate, in response to the centrifugal weights, has moved to engaging position against the action of its hold back springs, the positive plate may be withdrawn from the driven member by manual depression of the clutch pedal. Hence, the plates may be brought out of driving engagement to manually disconnect the driving and driven shafts. In traffic, when it is desired to get the vehicle away quickly, and in starting up steep grades, the clutch pedal may be operated in this manner to disengage the clutch for gear shifting operations, as in a vehicle of the type provided with a conventional manually operable clutch. However, it is contemplated to start the vehicle in high gear under normal operating conditions with the present clutch mechanism.

Referring more particularly to the manual declutching operation, it is readily appreciated that the torque required to be handled by the clutch, when the vehicle is operating in first or second gear, is much less than that required under normal operating conditions in high gear, due to the torque multiplication provided by such reduction gears. In view of the fact that the engaging pressures in a clutch of this type are higher than those in conventional manually operable clutch, due to the low coefficient of friction of the facing material employed herein, the required declutching pedal pressure, when the centrifugal weights are in their outermost position, is considerably greater than that required in a conventional manually operable clutch having the usual high frictional coefficient clutch facings. However, the staging of clutch engagement provided by the present clutch mechanisms does away with the necessity of exerting a heavy pressure upon the clutch pedal during normal gear shifting operations for the reason that it is contemplated that only the first and second stages of clutch engagement are to be used for such operation. In view of the fact that the plate pressures during the first and second stages of clutch engagement are relatively low, as compared to the final engaged pressure, as previously pointed out, the required declutching pressure will be of a correspondingly low value. Of course, if the vehicle is brought up to a speed corresponding to a relatively high engine speed in first or second gear, the plates will be forced together under the combined action of the first, second and third stage weights, and the advantage above outlined does not manifest itself because the plate pressure at this time is at a maximum value.

When it is desired to effect clutch engagement and the engine is operating at idling speeds or is stationary, the above mentioned latch mechanism may be released to allow the clutch pedal to move into its fully retracted position. This operation allows thrust member 57 to move to the right under the action of spring 54, which, acting through levers 61, brings positive plate 23 into the position shown in Figure 1, with the driven member clamped between it and the flywheel. A direct coupling is thus manually effected between the driving and driven shafts. Such operation is particularly desirable when the above described mechanism is installed in a motor vehicle, for the reason that when the engine is cold, and the battery is weak, it is sometimes desirable to connect the engine with the rear wheel of the vehicle, so that the vehicle may be towed or coasted in order to turn the engine over. Moreover, should the engine stall, from lack of fuel or any other cause, the vehicle can be pulled out of any dangerous location, such as a grade crossing or the like, by propelling the vehice with the starting motor.

Since slippage is inherent in the operation of a clutch of this type, heat is generated therein, and solid lubricant is freed from the facings during operation thereof. This heat and freed material should be eliminated. To this end means are provided for ventilating and cooling the clutch by an air stream, the air stream abstracting heat from the clutch by convection and carrying away the solid freed lubricant therewith. Clutch housing 2 is provided with an aperture 85 having a screen closure member 86, for preventing extraneous matter carried by the air from being introduced into the clutch mechanism. The air stream induced by the action of fan blades 20, is drawn through screen 86 and is deflected toward the axis of rotation by means of a baffle member 87, preferably constructed of sheet metal. Baffle 87 is annular in form, and is secured within the clutch housing by means of screws 88 or the like. The air stream, after being deflected toward shaft 11 by baffle member 87, is drawn into the clutch mechanism and a part of the stream, due to the rotation it is now undergoing caused by rotation of the associated clutch parts, flows radially over flange 44 of the positive plate and accordingly cools the flange and a portion of the air stream flows through apertures 46 in flanges 44, and flows over the rear face of the positive plate, thus efficiently abstracting heat therefrom. A portion of the air stream, for instance, when the plates are momentarily disengaged, flows over the engaging face of positive plate 23 and facing 21 on the driven member. A further portion of the air stream passes through the fan blade apertures in driving member 19 and thence between driving face of automatic plate 22 and facing 21 of the driven member 19. Also another part of the air stream flows between the flywheel web and the rear face of the automatic plate, thereby cooling the parts in this region.

Therefore, both faces of the automatic and positive plates are swept over by an air stream, and both faces of the driven member are likewise similarly cooled. When the plates are in relatively tight engagement, the air stream is divided substantially into two parts, one-half thereof flowing over the outer face of the automatic plate, and the other half flowing over the outer face of the positive plate.

Flanges 24, 25 and 41 of the automatic plate, flanges 44 formed on the positive plate, and the various connecting ribs 45, constitute very efficient heat radiating fins with which the air streams cooperate to rapidly remove the heat therefrom. Therefore, warping or distorting tendencies produced by uneven expansion of the metal which in turn is caused by non-uniform heat content thereof, are avoided for the reason that the entire area of each of the plates is efficiently cooled, and is maintained at a substantially uniform temperature. In this connection, it should be noted that there is no interruption whatever to the exhaust of heated dust laden air from the clutch mechanism, since no clutch cover member is employed.

While the heated, dust laden air removed from the clutch mechanism may be withdrawn or exhausted from the clutch housing in any suitable manner, I prefer to provide a single aperture 89 therein and associate suitable valves therewith for controlling the air flow from the housing (not here shown).

Baffle member 87 is disposed as closely adjacent the rotating parts as possible without contacting therewith, and in addition to deflecting the incoming air towards the axis of the mechanism, it serves the further important function of preventing the heated dust laden air exhausted from the peripheries of the positive and automatic plates from reentering the clutch mechanism, and being reheated to a still higher temperature, and depositing lubricant upon the plates.

Another preferred embodiment of my invention consists of the device illustrated in Figures 1, 2 and 3 of the drawings when modified in the following manner.

One of the single retarding units associated with the upper or lower weights 34 illustrated in Figure 2 of the drawings is removed, thus unbalancing the retarding forces acting upon this pair of weights. In view of the fact that this form of the invention is the same as that illustrated in Figure 1, with the exception that one of the single retarding units is omitted, it has not been illustrated in the drawings. The remaining parts illustrated in Figures 1, 2 and 3 are retained in this form of the invention, and the weight, from which the retarding unit was removed, is accordingly only restrained against outward movement by the action of the hold-back springs 29, and it will be referred to hereinafter as the first stage weight. One weight is provided with a single retarding unit, and the other groups of weights are provided with two, and three sets of retarding units respectively, and they will be hereinafter termed the second, third and fourth stage weights respectively.

In this form of my invention, the plate clearance, when the parts are disposed in automatic idling position, is slightly greater than that in the mechanism illustrated in Figure 1, for the purpose of allowing the automatic plate to tilt in the manner that is to be now set forth.

As the flywheel is accelerated, the first stage weight fulcrums outwardly in response to centrifugal force, and lifts one side of the automatic plate away from the flywheel web against the action of hold-back springs 29, and comparatively lightly clamps the driven member between it and the positive plate. The automatic plate tilts during the first stage of engagement operation, and only a portion of its driving surface engages the driven member. This insures a smooth yielding engagement of these frictional members and this arrangement, in fact, provides all of the advantages of the so-called cushion clutch discs, now appearing on the market, and yet possesses none of their disadvantages. During the first stage of operation, the second, third and fourth stage weights are held in their neutral positions under the influence of their retarding units. A torque of relatively small magnitude is transmitted to the driven member and the latter is smoothly accelerated.

Upon further acceleration of the flywheel, the second stage weight, which is located diametrically opposite the first stage weight, and is provided with a single retarding unit, fulcrums outwardly in response to centrifugal force, and acts upon the retracted side of the automatic plate, and the second stage of operation may be said to be initiated. The second stage weight fulcrums outwardly against the action of its retarding unit and lifts the automatic plate away from the flywheel against the action of hold-back springs 29 and into contact with the driven member with a greater force. Automatic plate 22, upon completion of the second stage of engagement operation, is preferably, though not necessarily, brought into substantially full contact with the driven member under the combined influence of the first and second stage weights.

The third stage of engagement operation is initiated when the third stage weights develop sufficient centrifugal force to overcome the effect of their retarding units and fulcrum outwardly. In the event that the automatic plate is not level, or in full driving contact with the driven member at the conclusion of the second stage of operation, the third stage weights act upon it and bring its surface into engagement with the entire frictional force of the driven member. In the third stage of operation, the plate pressure, and the pressure in spring 54, is built-up fairly rapidly under the influence of the first, second and third stage weights, and a torque of fairly rapidly increasing magnitude is transmitted to the driven member. The third and fourth stages are otherwise like the second and third stages of engagement operation of the mechanism illustrated in Figures 1, 2 and 3.

When final or positive driving engagement conditions are reached, the driven member is clamped or frictionally gripped between the automatic and positive plates, under the action of the centrifugal mechanism and the reaction of spring 54. The driving pressure is uniformly distributed about the entire periphery of the plates because the automatic plate is held in a position normal to the clutch axis under the influence of the automatic weights, and the latter are disposed against the flywheel rim under these conditions. The driving face of the positive plate is also normal to the clutch axis under these conditions and is urged into contact with the driven member by spring 54.

The automatic plate is therefore disposed parallel to the driven member when the two are disengaged, tilts into an angular or non-parallel position when clutch engagement is initiated, and tilts back, or is restored to parallel relation with the driven member when clutch engagement is complete.

In the present embodiment of my invention, I prefer to produce tilting actuation of the automatic plate and secure smooth yielding plate engagement by unbalancing the retarding units for the automatic weights in the manner just described, but it is to be understood that I may secure substantially the same results by unbalancing the hold-back pressure exerted by hold-back springs 29, by removing or reducing the strength of one or two adjacent springs. Actuation of the automatic weights in this alternative construction produces tilting operation of the automatic plate even if the automatic weights are of equal mass and are subjected to equal retarding effects, because the automatic plate is not subjected to a uniform hold-back pressure about its entire periphery.

It is also to be understood that my method of engaging clutch plates by tilting one of them during the engaging operation may be applied to positive plate 23, or in fact to the pressure plate of manually operable clutches, for securing a smooth yielding engagement.

Referring to Figures 4 and 5 of the drawings, I have shown a further modified form of clutch mechanism wherein pressure staging of clutch engagement is effected in a somewhat different manner from that of the clutch mechanism disclosed in Figures 1, 2 and 3 of the drawings. The clutch mechanism proper is of the same general type as that previously described, and therefore similar reference characters have been applied to like parts. The flywheel associated with this clutch mechanism is provided with a plurality of radial slots 24', the walls of which form driving faces and which receive integral, radially extending keys 26' formed on automatic plate 22'. Automatic plate 22' is similar to the automatic plate disclosed in connection with Figure 1 except it has no outer peripheral flange, and heads of the automatic weights seat in elongated bearing recesses 41' formed in the automatic plate 22' and operate in the same manner as those disclosed in Figure 1.

The throwout mechanism employed in this form of the invention is identical to that disclosed in the first clutch mechanism, except that collar 56' is provided with a pair of spaced seats which cooperate with a primary compression spring 54 and a secondary compression spring 54' The other ends of springs 54 and 54' seat upon spaced seats formed on web members 55'. When springs 54 and 54' are installed in the clutch mechanism, they are so disposed that spring 54 is under substantial compression when the positive plate is in automatic position, and spring 54' is only loosely disposed in the mechanism with a clearance between the same and its seat formed on member 56'. Accordingly, when the positive plate undergoes movement to the right, it will first be resisted by spring 54 and when it comes in contact with spring 54', movement thereof will be resisted by both springs. It will be appreciated that throwout lever 71 of the present form of the invention may be connected with a clutch pedal and latch arrangement similar to that described in connection with Figure 1.

The automatic weights are identical with those disclosed in the first form of the invention, and function in the same general manner. Two of the diametrically opposed weights 34' however, are only provided with one section and therefore have less mass than the remaining weights. Weights 34' are not provided with retarding units, and therefore movement thereof is only opposed by the action of holdback springs 29. The remaining weights are all retarded by preferably three retarding units, which are of equal strength. Weights 34 are provided with stop members of the type disclosed in Figure 1 for the purpose of preventing the retarding units from urging them inwardly beyond their neutral positions. Since weights 34' are not acted upon by retarding units, no stops are provided thereon.

The operation of this clutch mechanism will now be described. When the engine or other prime mover is operating substantially at idling speed, and the positive plate is disposed in automatic position, the weights are in their neutral positions, and the driving and driven shafts are disconnected. As the engine is accelerated, weights 34' swing outwardly about their pivots 43 against the action of holdback springs 29 causing automatic plate 22 to move over into light driving engagement with the driven member and a torque of small, and slowly increasing magnitude is transmitted from the driving to the driven shaft. The pressure between the plates during this first stage of clutch engagement slowly increases because only two of the weights are causing movement of the automatic plate. Upon further acceleration of the engine, the plate pressure builds up to a predetermined pressure under the influence of weights 34' and weights 34 than exert pressure upon the automatic plate. Weights 34, prior to this time, have already moved outwardly and have their fulcrums 43 bearing lightly against plate 22, but have been held in check by their retarding units.

When weights 34 commence to exert an influence upon an automatic plate 22, the first stage of clutch engagement operation may be said to be at an end and the second stage initiated. During the second stage of engagement operation weights 34 and 34' act upon the automatic plate, and the plate pressure builds up at an increased rate. Plate pressure in the secondary stage of the clutch engagement builds up at a predetermined rate, depending upon the retarding effect exerted upon the weights 34 by their retarding units, which may be varied by adjusting the spring pressure thereof.

During the first and second stages of clutch engagement that have just been described, it is preferable that movement of positive plate 23 is opposed or is resisted solely by spring 54. The parts are so designed that spring 54', carried by positive plate 23, does not contact with its seat on collar 56' until the second stage operation has been completed.

The second stage of clutch engagement is accordingly preferably terminated when plate 23 has been moved sufficiently under the influence of weights 34 and 34' to cause spring 54 to contact with its seat on member 56', at which time the third stage of clutch engagement operation may be said to be initiated. During the third stage of clutch engagement, pressure builds up rapidly due to the fact that the plate 22 is urged into engagement with plate 19 under the combined action of weights 34 and 34', and the movement of positive plate 23 is now resisted by springs 54 and 54'. During the third stage of clutch engagement, the relative speed of the driving and driven members is relatively small, and therefore a rapid build up of pressure is desirable to rapidly secure a non-slipping drive. When final engaging pressure conditions have been reached, the weights are in engagement with the flywheel rim and exert no further increasing forces upon the automatic plate, and the plates are then disposed in non-slipping engagement. If desired, for instance in a light motor vehicle, spring 54' may be omitted and spring 54 accordingly stiffened, thus doing away with the third stage clutch engagement and producing a two stage clutch mechanism, although it is preferable in heavy vehicles to employ three or more pressure stages for giving smooth clutch operation.

The other details of operation of this mechanism are the same as those described in connection with the mechanism illustrated in Figure 1.

Referring to Figure 11 of the drawings, I have graphically illustrated the relation that exists between plate pressure and engine speeds of the mechanism just described from initially engaged to fully engaged conditions. Lines A and B are drawn, assuming for the moment, that springs 54, 54' have been replaced by a single theoretical spring T, that is stronger than either of springs 54 or 54' and which will give a final reaction pressure equal to that exerted by springs 54 and 54' acting concurrently. Line A represents the pressure exerted by weights 34' during the first stage of clutch engagement under the theoretical conditions imposed, and this line produced represents the total driving pressure that weights 34' can exert by moving outward into contact with the flywheel rim, under the same theoretical conditions. Line B represents the pressure exerted by the weights 34 throughout their period of operation.

The operation under theoretical conditions will now be described. Line A represents the first stage of clutch engagement, and under these conditions a torque of small magnitude is transmitted by the automatic and positive plates to the driven member, and during the second stage weights 34 augment the action of weight 34' and cause pressure to build up at a fairly rapid rate until full driving pressure conditions are reached. The operation that has just been described is seen to be exactly the same as that shown in Figure 10 of the drawings except for the fact that in the present instance, under the theoretical conditions imposed, only two stages of clutch operation are effected.

Assuming now, that theoretical spring T is removed and replaced by springs 54 and 54', the operation under these conditions will be set forth. In view of the fact that spring 54 is not as strong or stiff as theoretical spring T, line A', which represents the actual pressure speed relations during the first stage of clutch operation, will slope less than line A. This is evident because the positive plate is not opposed by as strong a pressure as that present during the theoretical mode of operation just described, and the pressure between the plates accordingly, will not build up as rapidly. When the engine has attained a predetermined speed, weights 34 come into play, and their action is illustrated by line B. Line A' will therefore merge into line A'+B, the latter being the resultant of lines A' and B. The pressure during the second stage, builds up at a greater rate than during the first stage of clutch engagement operation. When the engine speed has become sufficiently great, and the positive plate has been displaced sufficiently for secondary backing spring 54' to come into play and oppose movement of the positive plate, the pressure between the plates will build up at a still greater rate, as illustrated by the curve C, and when the third stage of cluch operation is terminated, the plates are disposed in engagement under full driving pressure, under the combined influence of weights 34 and 34' and the combined reaction of springs 54 and 54'. This graph may be proved in the following manner: In view of the fact that the line A represents the full pressure exerting effect of springs 34' when they are disposed in their limit of engagement with the flywheel rim, and line B represents the full driving effort of weights 34 when they are disposed in contact with the flywheel rim, their ordinates when added together should result in the final driving pressure, and by consulting this graph it will be seen that this condition exists. Moreover, the ordinates of lines A'+B at the junction of the second and third stages should be equal to the ordinate of line A', at the same engine speed, plus the ordinate of line B at that point, and an inspection of this graph will show that this condition is true.

Therefore, weights 34' and 34, acting in conjunction with spring 54, respectively effect the first and second stages of clutch engagement operation, and the third stage of clutch engagement operation is performed by springs 34' and 34 acting concurrently with springs 54 and 54'.

In Figures 6, 7, 8 and 9 of the drawings, I have disclosed a weight arrangement which may be used in combination with either of the clutch mechanisms that have been previously described, and which produces pressure staging of clutch engagement.

Referring to Figure 6, first stage weights 91 have weight levers 36 secured to the outer face thereof. Shouldered studs 92 extend through apertures formed in levers 36 and are threaded into weights 91. Second stage weights 93 are U-shaped in cross section to fit over the first stage weights and are provided with aligned apertures 94 which receive studs 92, and are slidably mounted thereon. Relatively light compression springs 95 encircle studs 92 and react at one end against a pin 96 and at their other ends seat in recesses 97 formed in weights 93. Springs 95 are primarily employed for urging weights 93 towards the flywheel rim and in contact with levers 36, but have a further function that will presently appear. Motion of weights 93 outwardly is resisted by means of retarding units which consist of plungers 98 having a flange formed thereon, and which abut the bottom of an enlarged recess 99 formed in the flywheel rim. Plungers 98 are placed under compression by means of springs 101, which seat in recess 99 and bear against the plungers. Springs 101 are held in place in recesses 99 by means of threaded plugs 102. It is to be understood that, if desired, the type of retarding units disclosed in connection with the previously described mechanisms could be used in the present invention. However, it is preferable to positively limit the inward movement of the plungers so that they will not act upon weights 93 sufficiently to move them inwardly against the action of springs 95.

The operation of this clutch mechanism is as follows: With the centrifugal mechanism shown in Figures 6 to 9, inclusive, incorporated with a clutch mechanism similar to that in Figure 1, wherein only a single spring backs up the positive plate, clutch engagement will occur in two stages. With the automatic plate held in automatic position in the manner previously described, the engine or other prime mover is accelerated, and when a predetermined speed has been attained, first stage weights 91 move outwardly about their pivots 43 against the action of hold back springs 29, and also against the action of springs 95, which act on studs 92 to resist outward movement of the first stage weights to cause the automatic plate to engage the driven member. Due to the small mass of weights 91, the plate pressure is low and slowly increases during their operation. During operation of the first stage weights, the second stage weights have remained in their inner positions due to the retarding action of plungers 98, and have only rotated to a slight extent due to the slight rotation of their supporting studs 92, produced by movement of first stage weight 91. It is preferable to so design the second stage retarding units so that just prior to engagement of first stage weights 91 with the flywheel rim, second stage weights 93 will overcome the resistance of their retarding units, and will engage the lower face of lever 36. Thereafter, movement of weights 91 and 93 is concurrent, and their combined centrifugal force acts upon levers 36 to cause clutch engagement. Just prior to this engagement of weight 93 with lever 36, weights 91 are spaced a distance from the flywheel rim as seen in Figure 8, and are so spaced because the relatively small mass thereof, does not furnish sufficient force to further overcome the pressure built up in the backing spring for the positive plate at this time. Accordingly, when weights 91 reach the positions, where they cannot, by themselves, produce further movement of automatic plates 22, the first stage of clutch engagement may be said to be at an end. When weights 93 contact the lower faces of levers 36, the second stage of clutch engagement is initiated. During the second stage of clutch engagement, weights 91 and 93 exert their combined forces upon automatic plate 22, and the pressure built up between the plates is more rapid than that present in the first stage of clutch engagement. When both weights contact the flywheel rim, as shown in Figure 9, the pressure is sufficiently high to force the plates into non-slipping engagement, and the driving and driven shafts are then directly coupled.

Referring now to Figure 12 of the drawings, the relation between plate pressure and engine speed of the mechanism just described is graphically shown. Curve A represents the pressure-speed relation of the first stage weights 91, and the projection of this curve illustrates the maximum pressure that may be exerted by these weights. Curve B represents the pressure-speed relations of the second stage weights 93. The line A+B represents the actual plate pressure over the entire engagement operation, and is obtained by adding the ordinates of the projection of curve A, to the corresponding ordinates of curve B. The graph shows two pressure stages of approximately equal speed ranges, and during the first stage, the plate pressure is low and slowly increases, and in the second stage a relatively rapid build up of pressure occurs.

In the event that movement of positive plate 23 is opposed by two springs 54 and 54' as shown in Figure 4, the present weight organization will provide three pressure stages in a manner similar to that obtained in the mechanism illustrated in Figure 4, and the resultant pressure-speed curve of such mechanism will be similar to that disclosed in Figure 11 of the drawings. Line D is similar to line D of Figure 10 of the drawings.

Although I have disclosed spring pressed plungers for retarding the action of the centrifugal weights to produce pressure staging of clutch engagement, it is to be understood that any other suitable means may be used for producing this result, if desired. I have also disclosed, and prefer to employ centrifugal mechanism for actuating the automatic plate, but it is to be understood that any other suitable speed responsive mechanism may be employed, and the action thereof properly controlled to provide pressure staging of clutch engagement.

I have disclosed power transmitting mechanisms that may be designed and adjusted to give any desired operating characteristic by properly designing or adjusting the retarding units, and prefer to effect this result in this manner. It is to be understood, however, that if desired, the centrifugal weights may be designed to be larger or smaller than those here disclosed, and/or the pressure of the hold back springs 29 may be varied for the purpose of further modifying the operating characteristics of the mechanisms, without departing from the spirit of the present invention.

Referring now to Figures 13 and 14 I have disclosed a modified form of automatic power transmitting mechanism of the character shown in copending application of Robert P. Lewis, Serial No. 634,047, filed September 20, 1932, but which has been modified in accordance with the present invention to effect pressure staging of clutch engagement in accordance with the present invention. A driving shaft 104 at its rear end is provided with a bore 105 and a flange 106 which is secured by means of bolts 107 to a flywheel 108. Supported within bore 105 by a bearing 109 is the reduced end of a driven shaft 110 provided with splines 111 upon which is mounted for reciprocation a hub 112 having a flange 113. Secured to hub flange 113 by means of rivets 114 or the like is a driven disk 115 upon the periphery of which are mounted friction facings 21. The face of flywheel 108 cooperates directly with one of the facings 21 provided on driven member 17. The other facing 21 of member 17 cooperates with an automatic plate 122, which is provided with a plurality of rectangular recesses in which the heads 38 of centrifugal weights 34 fulcrum in the manner previously described. Automatic plate 122 and a reacting plate 123 are driven by the flywheel, and are accordingly keyed thereto by means of a series of plates 124 secured to flywheel 108 by bolts 125 and extending within slots 126 provided in automatic plate 122. Levers 36 extend through slots in reaction plate 123, which is provided with a flange 127. Retarding units are provided in flange 127 and cooperate with weights 34 to oppose movement thereof.

Reaction plate 123 is resiliently backed by means of compression springs 128 which act between a plate 129 bearing against reaction plate 123 and a plate 131 which bears against the inner ends of throwout levers 132 so that when weights 34 move outwardly in response to centrifugal force and cause automatic plate 122 to be moved toward the flywheel, driven member 17 will be resiliently clamped between the automatic plate and the flywheel. The outer end of each throwout lever is pivoted by a pin 133 between lugs 134 formed on the reaction plate 123 and is maintained in assembled relation by the side walls of a saddle member 135. Each throwout lever is designed for rocking movement within its saddle member 135 which is secured to the flywheel 108. The inner end of each throwout lever is disposed between plate 131, previously described and a throwout bearing assembly 136 which is actuated by means of throwout fork assembly 137 which extends outwardly beyond the clutch housing. In this instance clutch pedal 77 (not shown) may be mounted directly upon throwout fork 137.

In Figure 14A there is disclosed one of the holdback assemblies for urging automatic plate 122 and reaction plate 123 toward each other for retracting the centrifugal weights 34 when the parts are decelerated to idling speeds. Threaded into plate 122 is a shouldered stud 140 which extends through an aperture in plate 127. A compression spring 141 encircles stud 140; bears against the head thereof; and seats in the bottom of the recess 142 provided with the reaction plate. Several holdback spring assemblies are employed disposed preferably symmetrically about the periphery of the plates and between the weights and as they constantly urge the reaction and automatic plates toward each other, they constantly grip the heads 38 of the centrifugal weights and maintain them in the retracted position shown in Figure 14 when the engine is operating at idling speed or is stopped.

A disclosure of this organization has been made to illustrate the adaptability of my pressure staging mechanism to this type of power transmitting device, and it is contemplated that all of the methods of effecting pressure staging previously disclosed may be effectively carried out in mechanisms of this character. In the present instance, I have disclosed flange 124 of reaction plate 123 provided with retarding units of the type employed in the mechanisms illustrated in Figures 1, 2, 3, 4 and 5 of the drawings, and accordingly the methods of pressure staging disclosed in those figures may be readily effected in this mechanism. The resilient backing means provided for the reaction plate may also be designed to act in sequence and the additional pressure stage described in connection with Figures 4 and 5 accordingly obtained. It is also to be understood that the weight and lever organizations disclosed in Figures 6, 7, 8 and 9 may be effectively employed in the mechanism shown in Figure 13 if desired.

From the above detailed disclosure, it is seen that I have provided automatic power transmitting mechanisms that are relatively simple in design, have but few parts, may be cheaply manufactured, and which may be so designed or adjusted so as to have various operating characteristics to adapt them to the requirements of any particular installation. Moreover, these mechanisms, due to the pressure staging, or controlled clutch engagement effected by them, are especially adapted for use in motor vehicle drives, where such units are usually subjected to severe abuse by negligent or careless operators.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. An automatic power transmitting mechanism comprising, a driving member; a driven member; speed responsive means operably associated with said driving member for causing pressure to build up slowly between said driving and driven members as said driving member is accelerated to a predetermined speed, and for causing said pressure to build up at a greater rate when said driving member reaches a second predetermined speed, and reaction means for causing said pressure to build up at a still greater rate as said driving member is accelerated to a still higher speed.

2. In an automatic power transmitting mechanism, a driving member; a centrifugally operable element for applying increasing pressures to said member in accordance with variations in the speed of said driving member, and means associated with said element for causing said element to apply more rapidly increasing pressures to said driving member when the latter attains a predetermined speed.

3. In an automatic clutch mechanism, a positive plate; a plurality of spring means operably associated with said plate and arranged to sequentially act thereupon to oppose movement thereof; and means for sequentially imposing multiplied reactions of said spring means upon said plate.

4. An automatic power transmitting mechanism comprising a driving member; a driven member; said members having cooperating friction surfaces; means mounting said driving and driven members for engagement and disengagement; and means for automatically bringing said driving and driven members together into tilted relationship with a portion of the area of said friction surfaces in driving engagement when said driving member attains a predetermined speed, and for causing the area of surface engagement to progressively increase as said driving member is accelerated above said predetermined speed.

5. In a clutch mechanism, a driving member; a driven member; said driving and driven members having friction surfaces and mounted for engagement and disengagement; and means for automatically tilting said driving member and bringing a portion of its friction surface into driving engagement with the friction surface of said driven member when said driving member attains a predetermined speed, and for thereafter progressively increasing the area of contact of said friction surfaces as said driving member is further accelerated until the latter are in full engagement.

6. In a clutch, driving and driven members mounted for engagement and disengagement; a plurality of outwardly movable elements operable to force said members into engagement; means for automatically actuating said elements when said driving member attains a predetermined speed; and centrifugally operable means for automatically applying further actuating forces to said elements when said driving member attains a speed greater than said predetermined speed, to thereby effect pressure staging of clutch operation.

7. The mechanism set forth in claim 6, wherein said first and second named actuating means comprises centrifugally operable masses operable to apply actuating forces to said elements.

8. In a clutch, driving and driven members mounted for engagement and disengagement; a plurality of outwardly movable elements operable to force said members into driving engagement; and primary and secondary actuating means for automatically applying forces of comparatively low magnitude to said elements when said driving member is accelerated to a predetermined speed, and for applying forces of comparatively great magnitude to said elements when said driving member attains a higher predetermined speed.

9. In an automatic clutch, in sub-combination, a pair of members mounted for synchronous rotation and for movement toward and away from each other; a movable element operable to separate said members; means for automatically applying comparatively small actuating forces to said element when said members are accelerated to a predetermined speed; and means for applying actuating forces of larger magnitude to said element when said members attain a higher predetermined speed.

10. The device described in claim 9, wherein said actuating means comprises at least two centrifugally operable members arranged to operate in sequence and apply actuating forces to said element.

11. In a clutch, in sub-combination, a pair of rotatable members mounted for relative axial movement and adapted to normally effect clutch engagement when they are separated; a movable element for separating said members; means for applying actuating forces of comparatively small magnitude to said element when said members are accelerated through a predetermined speed range, and for applying actuating forces of comparatively large magnitude to said element when said members are accelerated through a high predetermined speed range, to thereby effect clutch engagement in stages.

12. A clutch as set forth in claim 11 wherein said element is adapted to fulcrum and apply forces directly to at least one of said members.

13. In a clutch, in sub-combination, a pair of members mounted for synchronous rotation and for relative movement toward and away from each other; a movable element for separating said members; a primary centrifugally operable weight for automatically applying actuating forces to said element when said members are accelerated through a predetermined speed range; a secondary centrifugally operable weight adapted to apply actuating forces to said element; and means for causing said secondary weight to apply actuating forces to said element only when said members are accelerated through a higher predetermined speed range.

14. The device described in claim 13, wherein said secondary weight is operably associated with said element by lost motion connecting means.

15. The device described in claim 13, wherein said primary weight is connected for synchronous movement with said element.

16. The device described in claim 13, wherein said last named means comprises means opposing the action of said secondary weight in response to centrifugal force.

17. In a clutch, driving and driven members mounted for engagement and disengagement; means for automatically bringing said members into engagement when one of them attains a predetermined speed; means for establishing and building up a yielding engagement pressure between said members in stages when they are automatically engaged, comprising primary and secondary resilient means associated with a mechanism for sequentially imposing multiplied reactions of said primary and secondary resilient means upon said members.

18. In a clutch, a driving member and a driven member mounted for engagement and disengagement; said members being disposed in substantially parallel relation when they are disengaged; means operable to force said members into engagement, and means for controlling engaging operations of said members, said controlling means being operable to cause said driving member to tilt when it is being initially engaged with said driven member.

19. The device described in claim 18, wherein said engaging means comprises means automatically operable in response to variations in the speed of one of said members.

20. The device described in claim 18, wherein said engaging means comprises speed-responsive means automatically operable to engage said members when said driving member attains a predetermined speed, and wherein the last named means of claim 18 comprises means for modifying the action of said speed-responsive means.

21. In a clutch, a driving member mounted for movement toward and away from a driven member and being normally parallel thereto when it is disengaged therefrom; means for causing said driving member to advance toward said driven member and tilt to thereby bring only limited portions of their areas into contact when they are initially engaged; and means for causing said members to come into full surface engagement.

22. The device described in claim 21, wherein said first named means comprises a centrifugally operable mechanism.

23. The device described in claim 21, wherein said first and second named means comprise primary and secondary centrifugally operable mechanisms, operable in sequence as the driving member is accelerated to apply engaging forces thereto.

24. An automatic clutch comprising a driving member, a driven member, a pressure plate revolving with the driving member and movable to engage the driven member, a spring mounting ring associated with the pressure plate, preloaded pressure springs acting against the spring mounting ring, clutch throwout mechanism operable at will to move said spring mounting ring against the pressure of the preloaded pressure springs, spring means tending to hold the pressure plate retracted to a fixed position relative to the spring mounting ring, centrifugally energized means adapted to force said pressure plate away from the spring mounting ring into initial engagement with the driven member, and other centrifugally energized means responsive only to a higher rotative speed than the first mentioned centrifugally energized means, for shifting the spring mounting means to transfer the pressure spring load from the throwout mechanism to the pressure plate whereby to obtain full clutching engagement under the predetermined preloading pressure of the pressure springs.

25. An automatic clutch comprising a driving member, a driven member, a pressure plate revolving with the driving member and movable to engage the driven member, a spring mounting ring associated with the pressure plate, preloaded pressure springs acting against the spring mounting ring, clutch throwout mechanism operable at will to move said spring mounting ring against the pressure of the preloaded pressure springs, spring means tending to hold the pressure plate retracted to a fixed position relative to the spring mounting ring, centrifugally energized means adapted to force said pressure plate away from the spring mounting ring into initial engagement with the driven member, other centrifugally energized means responsive only to a higher rotative speed than the first mentioned centrifugally energized means, for shifting the spring mounting means to transfer the pressure spring load from the throwout mechanism to the pressure plate whereby to obtain full clutching engagement under the predetermined preloading pressure of the pressure springs, said throwout mechanism being shiftable to engage or disengage the clutch contrary to the automatic control thereof.

26. An automatic clutch comprising a driving member, a driven member, a pressure plate revolving with the driving member and movable to engage the driven member, a spring mounting ring associated with the pressure plate, preloaded pressure springs acting against the spring mounting ring, clutch throwout mechanism operable at will to move said spring mounting ring against the pressure of the preloaded pressure springs, spring means tending to hold the pressure plate retracted to a fixed position relative to the spring mounting ring, centrifugally energized means adapted to force said pressure plate away from the spring mounting ring into initial engagement with the driven member, other centrifugally energized means responsive only to a higher rotative speed than the first mentioned centrifugally energized means, for shifting the spring mounting means to transfer the pressure spring load from the throwout mechanism to the pressure plate whereby to obtain full clutching engagement under the predetermined preloading pressure of the pressure springs, said throwout mechanism being shiftable to a position to advance the spring mounting ring and pressure plate and thereby force the pressure plate into driving engagement with the driven member independently of the action of the centrifugally energized means.

27. An automatic clutch comprising a driving member, a driven member, a pressure plate revolving with the driving member and movable to engage the driven member, a spring mounting ring associated wtih the pressure plate, preloaded pressure springs acting against the spring mounting ring, clutch throwout mechanism operable at will to move said spring mounting ring against the pressure of the preloaded pressure springs, spring means tending to hold the pressure plate retracted to a fixed position relative to the spring mounting ring, centrifugally energized means operatively engaged between the pressure plate and the spring mounting ring adapted to force said pressure plate away from the spring mounting ring into initial engagement with the driven member, and other centrifugally energized means responsive only to a higher rotative speed than the first mentioned centrifugally energized means, for shifting the spring mounting means to transfer the pressure spring load from the throwout mechanism to the pressure plate whereby to obtain full clutching engagement under the predetermined preloading pressure of the pressure springs.

28. An automatic clutch comprising a driving member, a driven member, a pressure plate revolving with the driving member and movable to engage the driven member, a spring mounting ring associated with the pressure plate, preloaded pressure springs urging the spring mounting ring towards the pressure plate, clutch throwout mechanism operable at will to move said spring mounting ring against the pressure of the preloaded pressure springs, spring means tending to move the pressure plate retracted to a fixed position relative to the spring mounting ring, centrifugally energized means operatively engaged between the pressure plate and the spring mounting ring adapted to force said pressure plate away from the spring mounting ring into initial engagement with the driven member, other centrifugally energized means responsive only to a higher rotative speed than the first mentioned centrifugally energized means, for shifting the spring mounting means to transfer the pressure spring load from the throwout mechanism to the pressure plate whereby to obtain full clutching engagement under the predetermined preloading pressure of the pressure springs, said throwout mechanism being shiftable to engage or disengage the clutch contrary to the automatic control thereof.

29. An automatic clutch comprising a driving member, a driven member, a pressure plate revolving with the driving member and movable to engage the driven member, a spring mounting ring associated with the pressure plate, pressure springs urging the spring mounting ring towards the pressure plate, clutch throwout mechanism operable at will to move said spring mounting ring against the pressure of the pressure springs, spring means tending to hold the pressure plate retracted to a fixed position relative to the spring mounting ring, a plurality of centrifugally energized means operatively engaged between the pressure plate and the spring mounting ring and varying responsive to a plurality of predetermined rotative speeds, a part only of said plurality of means being adapted to first take up running clearances by advancing the pressure plate into contact with the driven member at the lowest predetermined speed and all of said plurality of means being operable to subsequently transfer the preloaded pressure spring load from the throwout mechanism to the pressure plate at a predetermined higher rotative speed whereby to cause full clutch engagement under a predetermined spring load.

30. An automatic clutch comprising a driving member, a driven member, a pressure plate revolving with the driving member and movable to engage the driven member, a spring mounting ring associated with the pressure plate, pressure springs urging the spring mounting ring towards the pressure plate, clutch throwout mechanism operable at will to move said spring mounting ring against the pressure of the pressure springs, spring means tending to hold the pressure plate retracted to a fixed position relative to the spring mounting ring, a plurality of centrifugally energized means cooperatively engaged between the pressure plate and the spring mounting ring and variously responsive to a plurality of predetermined rotative speeds and adapted to first take up running clearances by advancing the pressure plate into contact with the driven member at the lowest predetermined speed and to subsequently transfer the preloaded pressure spring load from the throwout mechanism to the pressure plate at a predetermined higher rotative speed whereby to cause full clutch engagement under a predetermined spring load, said throwout mechanism being shiftable to engage or disengage the clutch contrary to the automatic control thereof.

WILLIAM E. HAUPT.